United States Patent [19]

Yamashita et al.

[11] 4,274,998
[45] Jun. 23, 1981

[54] DIESTER OF 3,5,3',5'-TETRABROMO-BISPHENOL A WITH HALOGENATED AROMATIC CARBOXYLIC ACID

[75] Inventors: Izumi Yamashita, Yokohama; Kunio Fukuda, Chigasaki; Kichiya Tazaki, Yokohama, all of Japan

[73] Assignee: Asahi-Dow Limited, Tokyo, Japan

[21] Appl. No.: 83,956

[22] Filed: Oct. 11, 1979

[30] Foreign Application Priority Data

Oct. 20, 1978 [JP] Japan .................. 53/129292

[51] Int. Cl.³ .................. C08K 5/18; C08K 5/17; C08K 5/13; C08K 5/10; C07C 101/74; C07C 69/78; C07C 69/84; C07C 69/76
[52] U.S. Cl. .................. 260/45.75 B; 260/45.85 B; 260/45.85 A; 560/43; 560/65; 560/105; 560/108
[58] Field of Search .................. 560/105, 108, 43, 65; 568/726; 260/45.85 R, 45.75 B, 45.85 A; 528/191, 202, 209, 219

[56] References Cited

U.S. PATENT DOCUMENTS

| | | | |
|---|---|---|---|
| 3,231,603 | 1/1966 | Hennis et al. .................. | 568/726 |
| 3,446,838 | 5/1969 | Szobel et al. .................. | 260/473 |
| 3,660,351 | 5/1972 | Schmidt et al. ............... | 260/45.85 R |
| 3,846,469 | 11/1974 | Gunsher et al. ............... | 260/463 |
| 3,883,481 | 5/1975 | Kopetz et al. ................. | 260/45.85 R |
| 4,105,628 | 8/1978 | Petersen ........................ | 260/45.85 R |

FOREIGN PATENT DOCUMENTS 1281937 7/1972 United Kingdom .

OTHER PUBLICATIONS

J. of Chemical and Engineering Data–vol. 2, No. 2, 252-254, (1967)—Godt et al.
Fire Retardants: Proceedings of 1974 International Symposium on Flammability and Fire Retardants—19-75—Technomic Pub. Co., Westport, Conn., pp. 68 to 85.

Primary Examiner—V. P. Hoke
Attorney, Agent, or Firm—Cushman, Darby & Cushman

[57] ABSTRACT

A novel diester compound of the formula (I):

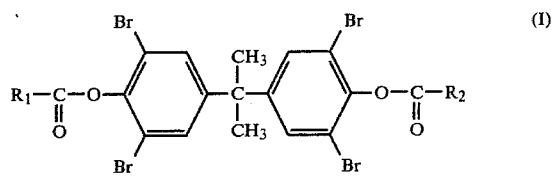

wherein each of $R_1$ and $R_2$ represents a group of the formula (II):

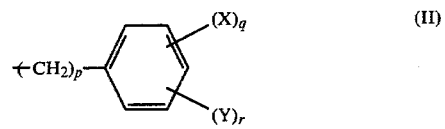

wherein X is bromine atom; Y at least one group selected from the group consisting of alkyl groups having 1 to 4 carbon atoms, alkoxy groups having 1 to 4 carbon atoms, hydroxyl group and primary, secondary or tertiary amino groups; p an integer of 0 to 4; q an integer of 1 to 4; r an integer 1 to 4 and (q+r) is equal to an integer of not more than 5, is found to be capable of imparting excellent flame-retardancy to various inflammable polymeric materials such as polystyrene, polyester, polyamide, polyphenylene oxide, etc. without deleterious effects on other physical properties of such polymeric materials.

25 Claims, No Drawings

DIESTER OF 3,5,3',5'-TETRABROMO-BISPHENOL A WITH HALOGENATED AROMATIC CARBOXYLIC ACID

This invention relates to novel bromine containing diester compounds which are particularly useful for imparting flame-retardancy to various polymeric materials.

A typical example of bromine containing flame-retardant additives known in the art is deca-bromodiphenylether. This compound, however, is very inferior in weathering resistance. As another example, there is also known 3,5,3',5'-tetrabromo-bisphenol A, which will disadvantageously lower heat distortion temperature of polymeric materials to a great extent when incorporated therein.

British Pat. No. 1,281,937 discloses a compound of the formula:

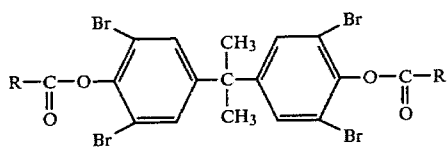

wherein R is an alkyl group having 1 to 3 carbon atoms. This compound also has the drawback to lower remarkably heat distortion temperature of polymeric materials to which said compound is added.

U.S. Pat. No. 3,846,469 discloses a compound of the formula:

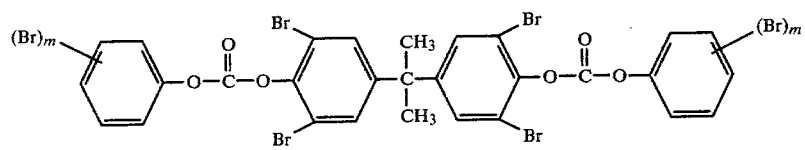

wherein m is an integer of 3 to 5. Such a compound can be added to polymeric materials for improvement of flame-retardancy only with disadvantageous decrease in impact strength of polymeric materials.

Furthermore, there is reported a compound of the formula:

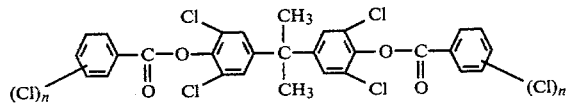

wherein n is 1 or 2, in Journal of Chemical and Engineering Data, Vol. 12, p. 252(1967). The compound is by far inferior in the effect of imparting flame-retardancy to polymeric materials to the compound of the present invention. Accordingly, in order to obtain equal levels of improvement in flame-retardancy, it is required to add a large amount of such a compound to inflammable polymeric materials, whereby other properties such as weathering resistance, heat distortion temperature and impact strength, etc. of the resultant polymeric materials are greatly impaired.

In accordance with the present invention, there is provided a novel diester compound represented by the following formula (I):

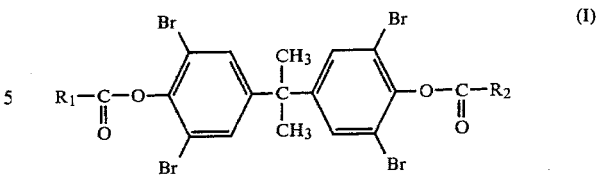

wherein $R_1$ and $R_2$, which may either be identical or different, represent the groups of the formula (II):

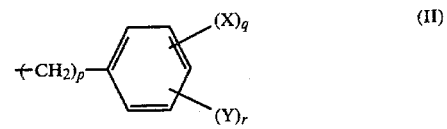

wherein X is bromine atom; Y at least one group selected from the group consisting of alkyl groups having 1 to 4 carbon atoms, alkoxy groups having 1 to 4 carbon atoms, hydroxyl group and primary, secondary or tertiary amino groups; p an integer of 0 to 4; q an integer of 1 to 4; r an integer of 1 to 4; and (q+r) is equal to an integer of not more than 5.

In the above formula (II), the notation $-(X)_q$ represents comprehensively bromine atoms in number of q substituted on the aromatic nucleus; while the notation $-(Y)_r$ comprehensively at least one substituents in number of r, which may be identical or different, selected from the groups as enumerated above.

Typical examples of $R_1$ and $R_2$ may include 4-methyl-3-bromophenyl; 4-methyl-3,5-dibromophenyl; 2-methyl-5-bromophenyl; 2-methyl-3,5-dibromophenyl; 2-methoxy-3,5-dibromophenyl; 2-methoxy-3-bromophenyl; 2-methoxy-3,5-dibromophenyl; 4-methoxy-3,5-dibromophenyl; 2-hydroxy-3,5-dibromophenyl; 4-hydroxy-3,5-dibromophenyl; 2-amino-3,5-dibromophenyl; 4-amino-3,5-dibromophenyl; 4-dimethylamino-3,5-dibromophenyl; 4-amino-3,5-dibromophenylmethyl; 2-hydroxy-3,5-dibromophenylmethyl; and the like.

The compound of the present invention has excellent heat stability and weathering resistance as well as excellent effect of imparting flame-retardancy to inflammable polymeric materials and is also free from the drawbacks of lowering impact strength and heat distortion temperature of polymeric materials when incorporated therein.

The compound of the present invention can be prepared according to various methods. For example, according to one method, it can be prepared by esterification of 3,5,3',5'-tetrabromo-bisphenol A with one or two carboxylic acids having the groups (II) as mentioned above, (which may be the same or different), in a non-alcoholic solvent such as benzene, toluene, tetrahydrofuran, ether or pyridine, using an acid catalyst such as sulfuric acid, hydrogen chloride, an aromatic sulfonic acid derivative, p-toluenesulfonic acid, phosphorus oxychloride, polyphosphoric acid, boron trifluoride, phosphorus pentachloride, boric acid-sulfuric acid, boron trifluoride etherate, trifluoroacetic acid, dicyclohexyl carbodiimide, etc.

As an alternative method, a carboxylic acid having the groups as represented by the formula (II) can be first converted to an acid halide by reaction with a reagent such as phosphorus trichloride, phosphorus pentachloride, thionyl chloride, triphenylphosphine dibromide, triphenylphosphine-carbon tetrachloride, thionyl chloride-dimethylformamide, thionyl chloride-pyridine (in the presence of zinc chloride catalyst), thionyl chloride-iodine, phosphorus pentachloride-acetyl chloride, etc. in the absence of a solvent or in a solvent such as benzene, methylene chloride, chloroform, tetrahydrofuran, ether, etc. The resultant acid halide is then subjected to esterification with 3,5,3',5'-tetrabromo-bisphenol A in the presence of a base such as sodium hydroxide, potassium hydroxide, dimethyl aniline, pyridine, sodium hydride, tetramethyl urea, and the like.

According to another method, a carboxylic acid anhydride having the groups as represented by the formula (II) can be esterified with 3,5,3',5'-tetrabromo-bisphenol A in the presence of a catalyst selected from sulfuric acid, zinc chloride, chlorosulfonic acid, sodium acetate, sodium methylate, p-toluenesulfonic acid and pyridine.

Furthermore, there may also be employed a method in which a nitrile having the groups of the formula (II) is reacted with 3,5,3',5'-tetrabromo-bisphenol A under anhydrous conditions in the presence of an acid catalyst such as hydrogen chloride, hydrogen bromide, hydrogen iodide, sulfuric acid, p-toluenesulfonic acid, etc.

The polymeric materials to which flame-retardancy can be imparted by the compound according to the present invention may be exemplified by polystyrene (including rubber-modified high impact polystyrene), AS resin, ABS resin, polyphenylene oxide, polyester, polyamide, polyethylene, polypropylene, polyisoprene, polybutadiene, polyacrylate, polycarbonate, etc. Polymeric mixtures comprising two or more of these polymers in suitable blending ratios may also be available.

If desired, other halo-containing flame-retardants and/or phosphorus-containing flame-retardants may also be used in combination with the compound of the present invention. Furthermore, there may also be added one or more synergetic flame-retardants such as antimony trioxide, zirconium silicate, zinc borate, titanium phosphate, red phosphorus, molybdenum oxide and others.

The effective amount of the present compound to be added for imparting flame-retardancy may depend on the extent of flame-retardancy required and the polymeric material to be applied. For example, for a polystyrene to be acceptable as V-O rate according to the UL-94 test method, it is necessary to add 10 to 30 parts by weight of the compound of the present invention and 2 to 10 parts by weight of antimony trioxide per 100 parts by weight of polystyrene. For all of the resins as mentioned above, preferable compositions comprise 100 parts by weight of an inflammable polymer, 5 to 40 parts by weight of a compound of the present invention and 0 to 15 parts by weight of antimony trioxide. Furthermore, there may also be added other conventional additives together with the compound of the present invention, such as stabilizers, coloring agents, anti-static agents, foaming agents, light stabilizers, fillers, etc.

The present invention is explained in further detail with reference to the following Examples, by which the present invention is not limited but various modifications are possible within the spirit of the invention.

EXAMPLE 1

Synthesis of di-(4-amino-3,5-dibromobenzoic acid)ester

In a flask equipped with a reflux condenser, 88.5 g (0.3 mole) of 4-amino-3,5-dibromobenzoic acid and 68 g (0.33 mole) of phosphorus pentachloride were reacted under reflux for one hour. After removal of phosphorus oxychloride under reduced pressure by means of an aspirator, the reaction product is subjected to vacuum distillation to obtain 69 g of 4-amino-3,5-dibromobenzoic acid chloride (yield: 73%).

While stirring a solution of 54.4 g (0.1 mole) of 3,5,3',5'-tetrabromo-bisphenol A and 30 ml of pyridine in 300 ml of tetrahydrofuran at room temperature, 63 g (0.2 mole) of the above 4-amino-3,5-dibromobenzoic acid chloride was slowly added dropwise, whereby white crystals were formed immediately. After the dropwise addition, stirring was continued for additional three hours at room temperature to complete the reaction, followed by evaporation of tetrahydrofuran. The residual crystals were dissolved in chloroform and the resultant solution was washed twice with ammonia water and three times with water. Thereafter, the washed solution was dried over anhydrous sodium sulfate, followed by removal of the solvent. The resultant crystals were recrystallized from ethanol/benzene (1:4) to give 93 g of white crystals (yield: 85%).

Elemental analysis: $C_{29}H_{18}N_2O_4Br_8$; Calculated: C, 31.69; H, 1.64; Br, 58.29; Found: C, 31.72; H, 1.61; Br, 58.18.

Infra-red spectrum: Absorptions of ester found at 1760 cm$^{-1}$ and 1240 cm$^{-1}$.

EXAMPLE 2

Synthesis of di-(2-hydroxy-3,5-dibromobenzoic acid)ester

Example 1 was repeated, except that 89 g (0.3 mole) of 2-hydroxy-3,5-dibromobenzoic acid was used in place of 4-amino-3,5-dibromobenzoic acid, to obtain 102 g of di-(2-hydroxy-3,5-dibromobenzoic acid)ester (yield: 93%).

Elemental analysis: $C_{29}H_{16}Br_8O_6$; Calculated: C, 31.64; H, 1.45; Br, 58.18; Found: C, 31.57; H, 1.49; Br, 58.21.

EXAMPLE 3

Synthesis of di-(4-methoxy-3,5-dibromobenzoic acid)ester

Using 93 g (0.3 mole) of 4-methoxy-3,5-dibromobenzoic acid in place of 4-amino-3,5-dibromobenzoic acid, the reaction was carried out under the same conditions as in Example 1 to obtain 103 g of di-(4-methoxy-3,5-dibromobenzoic acid)ester as white powders (yield: 91%).

Elemental analysis: $C_{31}H_{20}O_6Br_8$; Calculated: C, 32.98; H, 1.77; Br, 56.74; Found: C, 32.95; H, 1.78; Br, 56.69.

Infra-red spectrum: Absorptions of ester found at 1760 cm$^{-1}$ and 1240 cm$^{-1}$

EXAMPLE 4

Synthesis of diester with 4-methyl-2,6-dibromobenzoic acid

By carrying the reaction in the same manner as in Example 1 except that 88 g (0.3 mole) of 4-methyl-2,6-dibromobenzoic acid was used in place of 3,5-dibromobenzoic acid, there was prepared 95 g of di-(4-methyl-2,6-dibromobenzoic acid)ester (yield: 87%).

Elemental analysis: $C_{31}H_{20}O_4Br_8$; Calculated: C, 33.94; H, 1.82; Br, 58.39; Found: C, 33.91; H, 1.85; Br, 58.41.

Infra-red spectrum: Absorptions of ester found at 1760 cm$^{-1}$ and 1240 cm$^{-1}$

EXAMPLE 5

Preparation of flame-retardant polystyrene resin composition

A mixture comprising 100 parts by weight of a high impact polystyrene (Styron 475 D, produced by Asahi-Dow Limited, Japan), 20 parts by weight of the di-(4-amino-3,5-dibromobenzoic acid)ester as prepared in Example 1 and 5 parts by weight of antimony trioxide was prepared in a drum blender and extruded at 250° C. into pellets by an extruder having a Dulmage type screw. Using an injection molding machine, these pellets were molded at 220° C. into test pieces with thickness of ⅛". There was substantially no discoloration of the resin in the test piece even by molding after permitting the resin to be molded to reside in the cylinder of the molding machine for 10 minutes, indicating good heat stability. When burning test was conducted according to the test method UL-94, the test samples were found to be self-extinguishing with V-O rate. The test samples were also found to have an Izod impact strength with notch of 7.7 Kg·cm/cm (according to JIS-K6871), which impact strength was retained at as high as 5.8 Kg·cm/cm when measured after exposure of the sample to a Sunshine Weather-meter for 400 hours. The samples were also found to have a Vicat softening point (ASTM-D 1525) of 104° C.

EXAMPLE 6

Preparation of flame-retardant polyphenyleneoxide resin composition

One hundred parts by weight of a polyphenyleneoxide resin (Xyron 500 H: produced by Asahi-Dow Limited), 20 parts by weight of the di-(4-amino-3,5-dibromobenzoic acid)ester as prepared in Example 1 and 5 parts by weight of antimony trioxide were blended in a drum blender and extruded at 250° C. into pellets by an extruder having a Dulmage type screw. Then, the pellets were injection molded into test pieces with thickness of ⅛". Burning test was conducted according to the test method UL-94, whereby the samples were found to be self-extinguishing with V-O rate.

EXAMPLE 7

Preparation of flame-retardant polybutylene terephthalate resin composition

One hundred parts by weight of a polybutylene terephthalate resin (PBT 1401 of a Toray's product), 20 parts by weight of the di-(4-amino-3,5-dibromobenzoic acid)ester as prepared in Example 1 and 7 parts by weight of antimony trioxide were blended in a drum blender and extruded (at 250° C.) into pellets by an extruder having a Dulmage type screw. Then, the pellets were injection molded into test pieces with thickness of ⅛". Burning test was conducted according to the test method UL-94, whereby the samples were found to be self-extinguishing with V-O rate.

EXAMPLE 8

Preparation of flame-retardant polyamide composition

The same procedure as in Example 7 ws repeated except that 100 parts by weight of nylon 6 (Toray's Amilan 1017) were used in place of the polybutylene terephthalate resin and that the amount of the di-(4-amino-3,5-dibromobenzoic acid was changed to 15 parts by weight. The result of the burning test was the same as in Example 7.

EXAMPLES 9-11

Various flame-retardant polystyrene compositions were prepared according to the same procedure as in Example 5 except for using various diesters as prepared in Examples 2 to 4 for the compositions of Examples 9 to 11, respectively. The result of burning test conducted by the same method as in Example 5 for any of the samples prepared from these compositions was similar to that reported in Example 5.

What we claim is:

1. A compound of the formula (I):

$$R_1-C(=O)-O-\underset{Br}{\underset{Br}{\bigcirc}}-C(CH_3)_2-\underset{Br}{\underset{Br}{\bigcirc}}-O-C(=O)-R_2 \quad (I)$$

wherein $R_1$ and $R_2$, which may be identical or different, represent the groups of the formula (II):

$$-(CH_2)_p-\underset{(Y)_r}{\underset{(X)_q}{\bigcirc}} \quad (II)$$

wherein X is bromine atom; Y at least one group selected from the group consisting of alkoxy groups having 1 to 4 carbon atoms, hydroxyl groups and primary, secondary or tertiary amino groups; p an integer of 0 to 4; q an integer of 1 to 4; r an integer of 1 to 4; and (q+r) is equal to an integer of not more than 5.

2. A compound according to claim 1 where Y is a primary, secondary, or tertiary amino group.

3. A compound according to claim 2 where Y is a primary amino group.

4. A compound according to claim 3 where q is 1 to 2 and r is 1.

5. A compound according to claim 4 where $R_1$ and $R_2$ are identical and are $$\underset{Br}{\underset{H_2N}{\bigcirc}}-$$

6. A compound according to claim 1 where Y is alkoxy of 1 to 4 carbon atoms.

7. A compound according to claim 6 where q is 1 to 2 and r is 1.

8. A compound according to claim 1 where Y is hydroxyl.

9. A compound according to claim 8 where q is 1 to 2 and r is 1.

10. A polymeric material improved in flame-retardancy, comprising:
(a) at least one inflammable polymer selected from the group consisting of polystyrene, acrylonitriles-tyrene resin, acrylonitrile-butadiene-styrene resin, polyphenylene oxide, polyester, polyamide, polyethylene, polypropylene, polyisoprene, polybutadiene, polyacrylate and polycarbonate; and
(b) at least one compound of the formula (I):

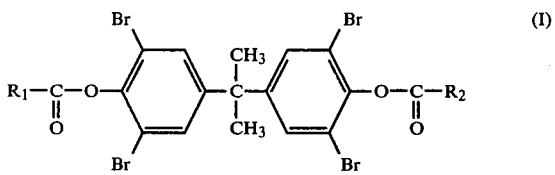

wherein $R_1$ and $R_2$, which may be identical or different, represent the groups of the formula (II):

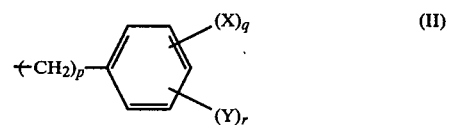

wherein X is bromine atom; Y at least one group selected from the group consisting of, alkoxy groups having 1 to 4 carbon atoms, hydroxyl group and primary, secondary or tertiary amino groups; p an integer of 0 to 4; q an integer of 1 to 4; r an integer of 1 to 4; and (q+r) is equal to an integer of not more than 5.

11. A polymeric material according to claim 10, comprising 100 parts by weight of the inflammable polymer (a), 5 to 40 parts by weight of the compound (b) and 0 to 15 parts by weight of antimony trioxide.

12. A polymeric material according to claim 3, wherein the inflammable polymer (a) is polystyrene.

13. A polymeric material according to claim 3, wherein the inflammable polymer (a) is polyphenyleneoxide.

14. A polymeric material according to claim 3, wherein the inflammable polymer (a) is polyester.

15. A polymeric material according to claim 3, wherein the inflammable polymer (a) is polyamide.

16. A polymeric material according to claim 3, wherein the inflammable polymer (a) is polycarbonate.

17. A polymer material according to claim 2 where Y is a primary, secondary, or tertiary amino group.

18. A polymer material according to claim 17 where q is 1 to 2 and r is 1.

19. A polymer material according to claim 18 where $R_1$ and $R_2$ are identical and are

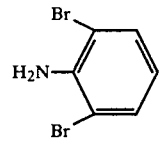

20. A polymer material according to claim 2 where Y is alkoxy of 1 to 4 carbon atoms.

21. A polymer material according to claim 20 where q is 1 to 2 and r is 1.

22. A polymer material according to claim 2 where Y is hydroxyl.

23. A polymer material according to claim 22 where q is 1 to 2 and r is 9.

24. A compound of the formula (1)

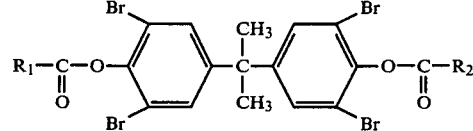

wherein $R_1$ and $R_2$, which may be identical or different, represent the groups of the formula (II)

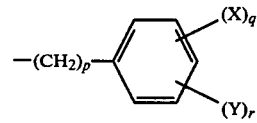

where X is bromine atom; Y is at least one group selected from the group consisting of alkyl groups having 1 to 4 carbon atoms, alkoxy groups having 1 to 4 carbon atoms, hydroxyl groups and primary, secondary or tertiary amino groups; p an integer of 1 to 4; q an integer of 1 to 4; r an integer of 1 to 4; and (q+r) is equal to an integer of not more than 5.

25. A polymeric material improved in flame-retardancy, comprising
(a) at least one inflammable polymer selected from the group consisting of polystyrene, acrylonitrile-styrene resin, acrylonitrile-butadiene-styrene resin, polyphenylene oxide, polyester, polyamide, polyethylene, polypropylene, polyisoprene, polybutadiene polyacrylate, and polycarbonate; and
(b) at least one compound of the formula (I)

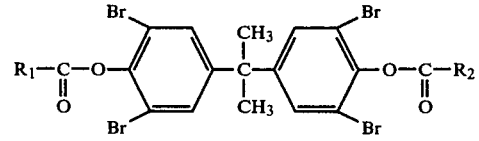

wherein Rhd 1 and $R_2$, which may be identical or different, represent the group of the formula (II)

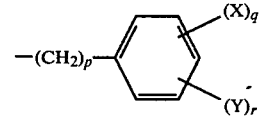

wherein X is bromine atom, Y at least one group selected from the group consisting of alkyl groups having 1 to 4 carbon atoms, alkoxy groups having 1 to 4 carbon atoms, hydroxyl group and primary, secondary or tertiary amino groups; p an integer of 1 to 4; q an integer of 1 to 4, r an integer of 1 to 4; and (q+r) is equal to an integer of not more than 5.

* * * * *